United States Patent
Barnes et al.

(10) Patent No.: US 12,311,515 B2
(45) Date of Patent: May 27, 2025

(54) CUTTING TOOL FOR BAND CLAMP

(71) Applicant: OETIKER TOOL CORPORATION, Branford, CT (US)

(72) Inventors: Michael Barnes, Shelton, CT (US); Joseph Krzyzankski, New Haven, CT (US); Patrice B. Bansa, Oakville (CA)

(*) Notice: Subject to any disclaimer, the term of this patent is extended or adjusted under 35 U.S.C. 154(b) by 263 days.

(21) Appl. No.: 17/774,572

(22) PCT Filed: Nov. 13, 2020

(86) PCT No.: PCT/US2020/060398
§ 371 (c)(1),
(2) Date: May 5, 2022

(87) PCT Pub. No.: WO2021/101803
PCT Pub. Date: May 27, 2021

(65) Prior Publication Data
US 2022/0388127 A1    Dec. 8, 2022

Related U.S. Application Data

(60) Provisional application No. 62/936,805, filed on Nov. 18, 2019.

(51) Int. Cl.
*B25B 7/22* (2006.01)
*B21D 39/04* (2006.01)

(52) U.S. Cl.
CPC ............... *B25B 7/22* (2013.01); *B21D 39/04* (2013.01)

(58) Field of Classification Search
CPC ......... B25B 7/00; B26B 17/00; B26B 17/003; B26B 17/006; B26B 17/02

(Continued)

(56) References Cited

U.S. PATENT DOCUMENTS 483,869 A   10/1892   Randle
854,433 A   5/1907    Rowan
(Continued)

FOREIGN PATENT DOCUMENTS

CN   104203507 A   12/2014
CN   107848128 A   3/2018
(Continued)

OTHER PUBLICATIONS

Office Action for Indian Patent Application No. 202217029532; Office Action Mail Date Sep. 9, 2022 (pp. 1-8).
(Continued)

*Primary Examiner* — Phong H Nguyen
(74) *Attorney, Agent, or Firm* — McCarter & English, LLP; Dave S. Christensen (57) ABSTRACT

A cutting tool and a method of operating a cutting jaw is provided. The cutting tool includes a first jaw member having a first cutting edge and a first relief area adjacent the first cutting edge, the first jaw member further having a first projection extending from the first cutting edge into the first relief area. A second jaw member has a second cutting edge and a second relief area adjacent the second cutting edge, the second jaw member further having a second projection extending from the second cutting edge into the second relief area. Wherein the first projection and the second projection are sized to engage a leg of an ear clamp and prevent fully closing the ear clamp when the cutting tool is used in a crimping operation.

16 Claims, 6 Drawing Sheets

(58) Field of Classification Search
USPC .............. 30/175, 178, 186, 190–193; 81/3.6
See application file for complete search history.

(56) References Cited

U.S. PATENT DOCUMENTS

| | | | |
|---|---|---|---|
| 975,385 | A | 11/1910 | Chappel |
| 4,459,717 | A | 7/1984 | Halstead |
| 5,003,695 | A | 4/1991 | Lipscomb et al. |
| 6,807,961 | B2 * | 10/2004 | Burrows ................ B28D 1/223 |
| | | | 30/252 |
| 2014/0041195 | A1 * | 2/2014 | Hoang ..................... B25B 7/00 |
| | | | 29/434 |
| 2019/0240821 | A1 | 8/2019 | Wetzel et al. |

FOREIGN PATENT DOCUMENTS

| | | |
|---|---|---|
| CN | 207983415 U | 10/2018 |
| CN | 110087835 A | 8/2019 |
| TW | I645948 B | 1/2019 |

OTHER PUBLICATIONS

Notification of Transmittal of the International Search report for International Application No. PCT/US2020/060398; Report Issued: Jan. 11, 2021, Report Received: Feb. 8, 2021; 1 page.
Written Opinion of the International Searching Authority for International Application No. PCT/US2020/060398; Report Issued: Jan. 11, 2021, Report Received: Feb. 8, 2021; 8 pages.

* cited by examiner

CUTTING TOOL FOR BAND CLAMP

CROSS REFERENCE TO RELATED APPLICATIONS

This application claims the benefit of U.S. Application No. 62/936,805 filed on Nov. 18, 2019 which is incorporated herein by reference in its entirety.

BACKGROUND

The subject matter disclosed herein relates to a hand tool, and in particular to a hand tool for cutting clamps, such as ear clamps that are used for coupling tubing to fittings, such as crossed-linked polyethylene (PEX) for example.

PEX tubing is used in a variety of applications to transfer fluid between locations. PEX tubing provides many advantages as its inherent flexibility allows for installations that would be difficult or impossible with traditional tubing materials, such as copper. Where an installation uses a joint, such as a t-joint for example, or multiple tube are connected together, a fitting is used. Typically, the PEX tube is installed over the outer diameter of the fitting and a clamp is installed over the tube. The clamp secures the tube on the fitting.

One type of clamp is a stainless steel band clamp that is formed in a shape of a ring. The ring is slid over and surrounds the tubing and fitting. A tool is then used to crimp the clamp onto the tube. The process of crimping the band reduces the diameter of the band to secure the tubing and also deforms the band material (forming an "ear") to reduce the risk of the clamp loosening over time.

In some instances it may be desirable to remove the clamp. Typically, a second tool, referred to as a clamp cutter is used to cut or slice the ear portion and allow the clamp to be removed. The clamp cutter looks similar to the crimping tool with the exception that the jaws on the cutter tool are sharp and in the crimping tool they are rounded. It is possible to crimp the clamp with the cutter tool (intentionally or unintentionally), however potentially damages the clamp, causing a crack that eventually results in the clamp loosening or coming off of the tube. Unfortunately, by the time the clamp loosens any record of which tool was used is no longer available, and the property owner only knows that the clamp did not function the way it was intended.

Accordingly, while existing clamp cutting tools are suitable for their intended purposes the need for improvement remains, particularly in providing a cutting tool that includes the features and advantages described herein.

BRIEF DESCRIPTION

According to one aspect of the disclosure a cutting tool is provided. The cutting tool includes a first jaw member having a first cutting edge and a first relief area adjacent the first cutting edge, the first jaw member further having a first projection extending from the first cutting edge into the first relief area. A second jaw member has a second cutting edge and a second relief area adjacent the second cutting edge, the second jaw member further having a second projection extending from the second cutting edge into the second relief area. Wherein the first projection and the second projection are sized to engage a leg of an ear clamp and prevent fully closing the ear clamp when the cutting tool is used in a crimping operation.

In addition to one or more of the features described herein, or as an alternative, further embodiments of the tool may include the first projection and the second projection having a convex outer surface. In addition to one or more of the features described herein, or as an alternative, further embodiments of the tool may include the first projection and the second projection being centrally located along the first cutting edge and the second cutting edge. In addition to one or more of the features described herein, or as an alternative, further embodiments of the tool may include the first cutting edge and the second cutting edge being configured to cut the leg of the ear clamp when the cutting tool is used in a cutting operation.

In addition to one or more of the features described herein, or as an alternative, further embodiments of the tool may include the first cutting edge being configured to cut the leg in a first area between the first projection and a first side of the first jaw member. In addition to one or more of the features described herein, or as an alternative, further embodiments of the tool may include the second cutting edge being configured to cut the leg in a second area between the second projection and a second side of the second jaw member. In addition to one or more of the features described herein, or as an alternative, further embodiments of the tool may include the first area being opposite the second area.

In accordance with another embodiment, a cutting tool is provided. The cutting tool includes a first handle and a second handle pivotally coupled to the first handle. A first jaw is pivotally coupled to the first handle, the first jaw having a first pincher end, the first pincher end having a first relief area, a first cutting edge, and a first projection that extends from the first cutting edge into the first relief area. A second jaw is pivotally coupled to the second handle, the second jaw having a second pincher end, the second pincher end having a second relief area, a second cutting edge, and a second projection that extends from the second cutting edge into the second relief area, the second jaw being pivotally coupled to the first jaw. Wherein the first projection and the second projection are sized to engage a leg of an ear clamp and prevent fully closing of the ear clamp when the cutting tool is used in a crimping operation.

In addition to one or more of the features described herein, or as an alternative, further embodiments of the tool may include the first projection and the second projection having a convex outer surface. In addition to one or more of the features described herein, or as an alternative, further embodiments of the tool may include the first projection and the second projection being centrally located along the first cutting edge and the second cutting edge. In addition to one or more of the features described herein, or as an alternative, further embodiments of the tool may include the first cutting edge and the second cutting edge being configured to cut the leg of the ear clamp when the cutting tool is used in a cutting operation. In addition to one or more of the features described herein, or as an alternative, further embodiments of the tool may include the first cutting edge being configured to cut the leg in a first area between the first projection and a first side of the first jaw.

In addition to one or more of the features described herein, or as an alternative, further embodiments of the tool may include the second cutting edge being configured to cut the leg in a second area between the second projection and a second side of the second jaw. In addition to one or more of the features described herein, or as an alternative, further embodiments of the tool may include the first area being opposite the second area.

According to one aspect of the disclosure a method of operating a cutting tool with an ear clamp is provided. The method includes placing an ear portion of the ear clamp between a first cutting edge and a second cutting edge of the cutting tool, the first cutting edge having a first projection extending from the first cutting edge into a first relief area, the second cutting edge having a second projection extending from the second cutting edge into a second relief area. Handles of the cutting tool are moved from an open position towards a closed position. The first projection and the second projection are engaged on a pair of opposing legs of the ear portion as the handles are moved from the open position towards the closed position. The ear clamp is prevented fully closing based on the engaging of the first projection and the second projection on the pair of opposing legs of the ear portion.

In addition to one or more of the features described herein, or as an alternative, further embodiments of the method may include placing one of the pair of opposing legs between the first cutting edge and the second cutting edge, wherein the first projection and the second projection are offset from the ear portion of the ear clamp. In addition to one or more of the features described herein, or as an alternative, further embodiments of the method may include moving the handles from the open position towards the closed position. In addition to one or more of the features described herein, or as an alternative, further embodiments of the method may include cutting through the one of the pair of opposing legs as the handles are moved to the closed position.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments disclosed herein provide for a cutting tool for band clamps, such as an ear clamp used with PEX tubing. Embodiments of the cutting tool provide advantages in preventing an ear clamp from being fully closed when an operator attempts to crimp using the cutting tool.

Referring now to FIGS. 1-4, a cutting tool 20 is shown having a first handle 22 and a second handle 24. The handles 22, 24 are covered by a grip member 26, 28 respectively. The handles 22, 24 are rotationally connected to each other by a pivot 30. The first handle 22 includes an end portion 32A, 32B and the second handle 24 includes an end portion 34A, 34B. The end portions 32A, 32B define a u-shaped slot that is sized to receive a first jaw member 36. Similarly the end portions 34A, 34B define a u-shaped slot that is sized to receive a second jaw member 38. The jaws 36, 38 are pivotally coupled to the end portions 32A, 32B, 34A, 34B by pivots 40, 42 respectively.

The jaws 36, 38 are further rotationally coupled to each other by a pivot 44. In the illustrated embodiment, the pivot 44 is disposed between a pincher end 46, 48 and the pivots 40, 42 such that when the handles 22, 24 are moved from the open position (FIG. 1) to a closed position (FIG. 2), the pincher ends 46, 48 move towards each other. The pincher ends 46, 48 each include an edge 50, 52 that is sharp, such that when the tool 20 is placed over an ear clamp (FIG. 6), the closing of the handles 22, 24 causes the edges 50, 52 to cut through a leg of the ear clamp as the pincher ends 46, 48 move towards each other.

To facilitate the cutting of the clamp, each jaw 36, 38 includes a relief area 54, 56 adjacent the edges 50, 52 that provides a space for the displaced/cut material to move as the edges cut through the material. It should be appreciated that the cutting of the ear on the clamp is performed by the area of the edges 50, 52 that are closer to the sides of the jaws 36, 38. In other words, the cutting action is not performed by the center section of the edges 50, 52.

It should be appreciated that an operator may intentionally or unintentionally use a cutting tool 20 to crimp an ear clamp by placing the ear portion in between the edges 50, 52 (FIG. 5) and squeezing the handles 22, 24 causing the edges 50, 52 to crimp the ear clamp. Unfortunately, this unintended use of the tool by the operator may damage the ear portion of the clamp causing the clamp to loosen over time.

To avoid this situation, in the illustrated embodiment a projection 58, 60 (FIG. 3, FIG. 4) is provided on each jaw 36, 38 that extend from the edges 50, 52 into the relief areas 54, 56. It should be appreciated that the projections 58, 60 are not located in the cutting areas of the edges 50, 52, but rather is centrally located. In an embodiment, the projections 58, 60 are centered on the edges 50, 52 between the sides of the jaws 36, 38. As such, the projections 58, 60 do not interfere with the intended cutting operation of the tool 20. In an embodiment, the projection 58 is formed as a rib having an outer surface with a convex curvature. The rib is an elongated body that has one end adjacent the edges 50, 52 and an opposing end that intersects the surface defining the relief area 54, 56. The projections 58, 60 are sized such that when the cutting tool 20 is used for crimping, the projections 58, 60 contact the ear portion of the clamp and prevent the cutting tool 20 from fully closing the clamp.

Figure 1:
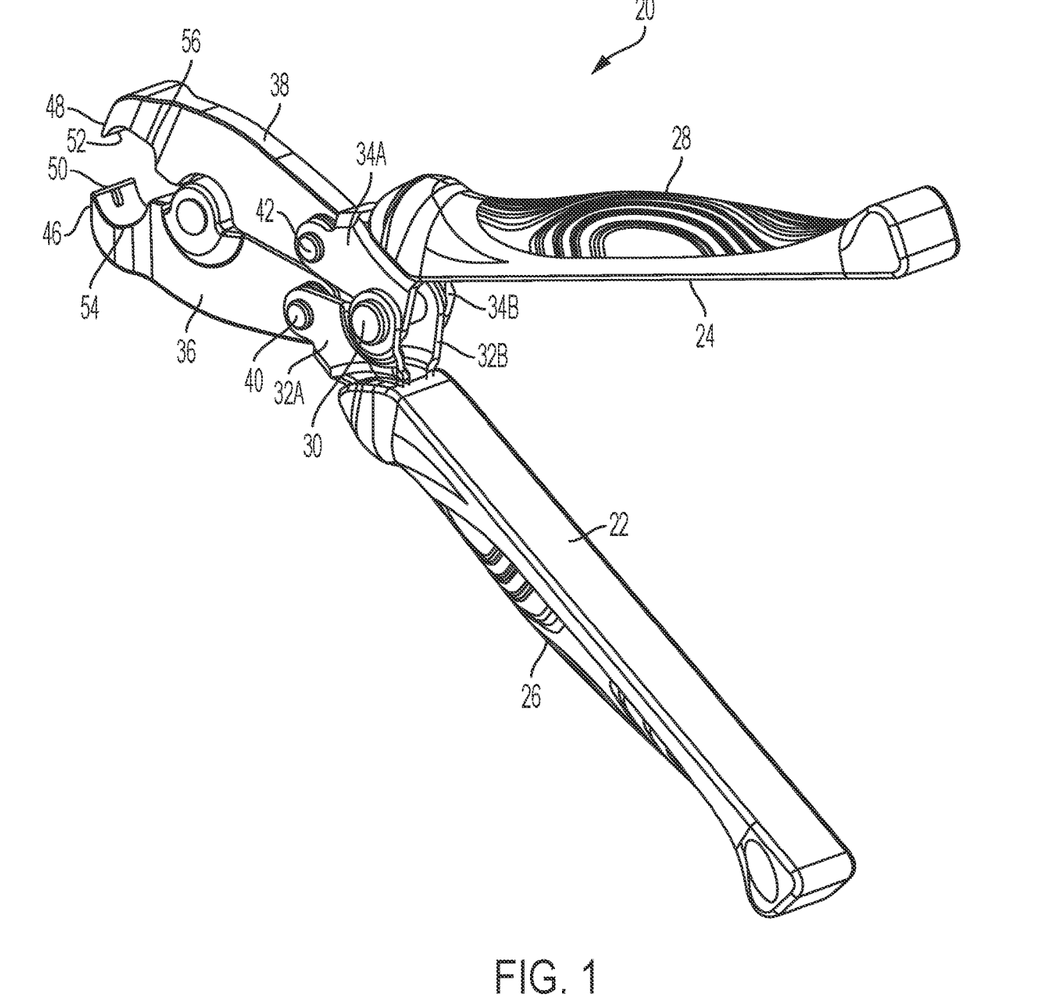
FIG. 1 is a perspective view of a cutting tool in an open position in accordance with an embodiment.
Figure 2:
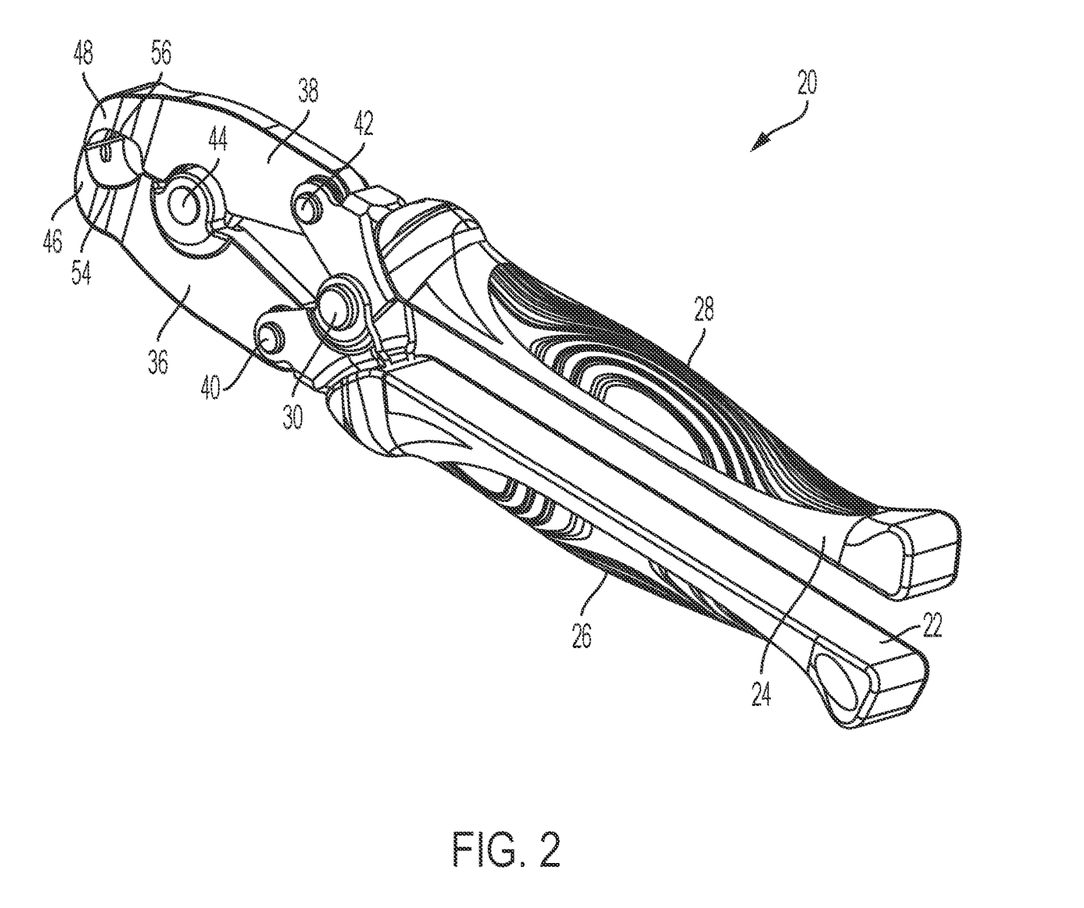
FIG. 2 is a perspective view of the cutting tool of FIG. 1 in a closed position.
Figure 3:
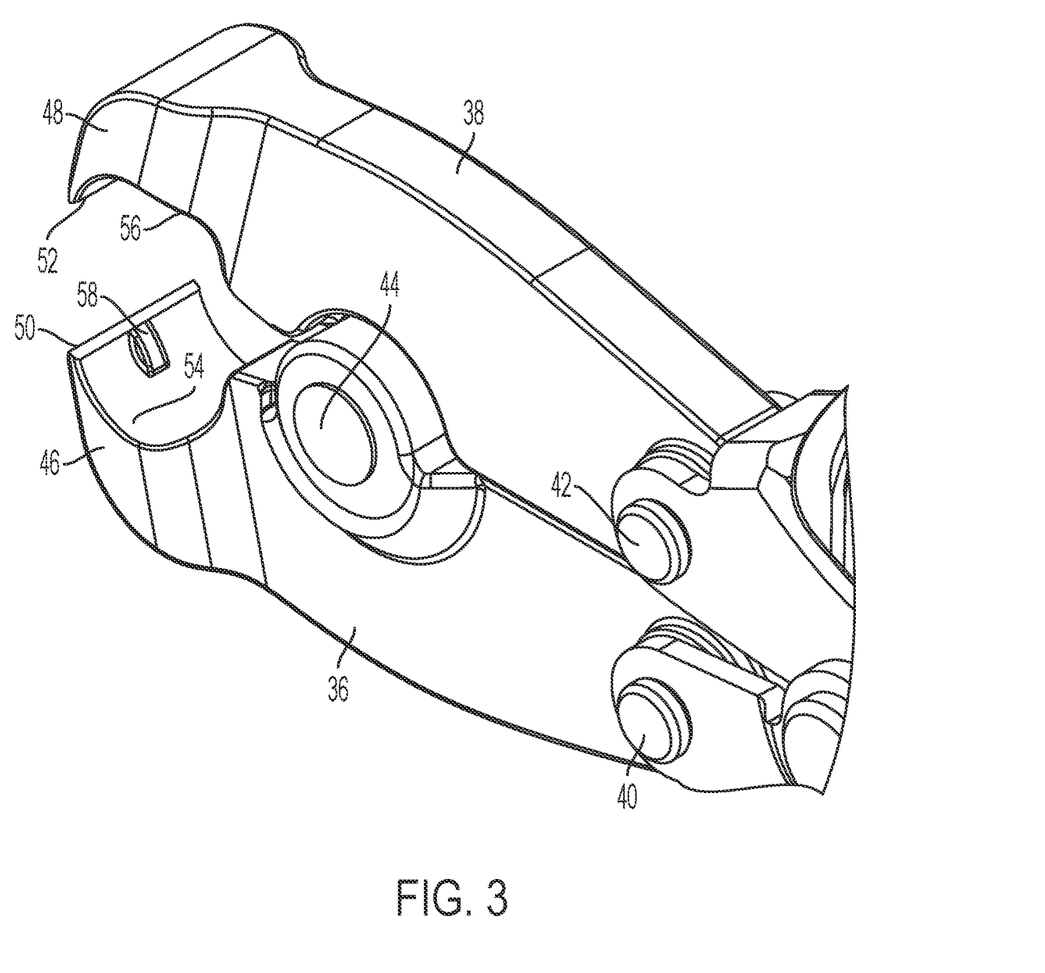
FIG. 3 is an enlarged perspective view of the cutting end of the cutting tool of FIG. 1.
Figure 4:
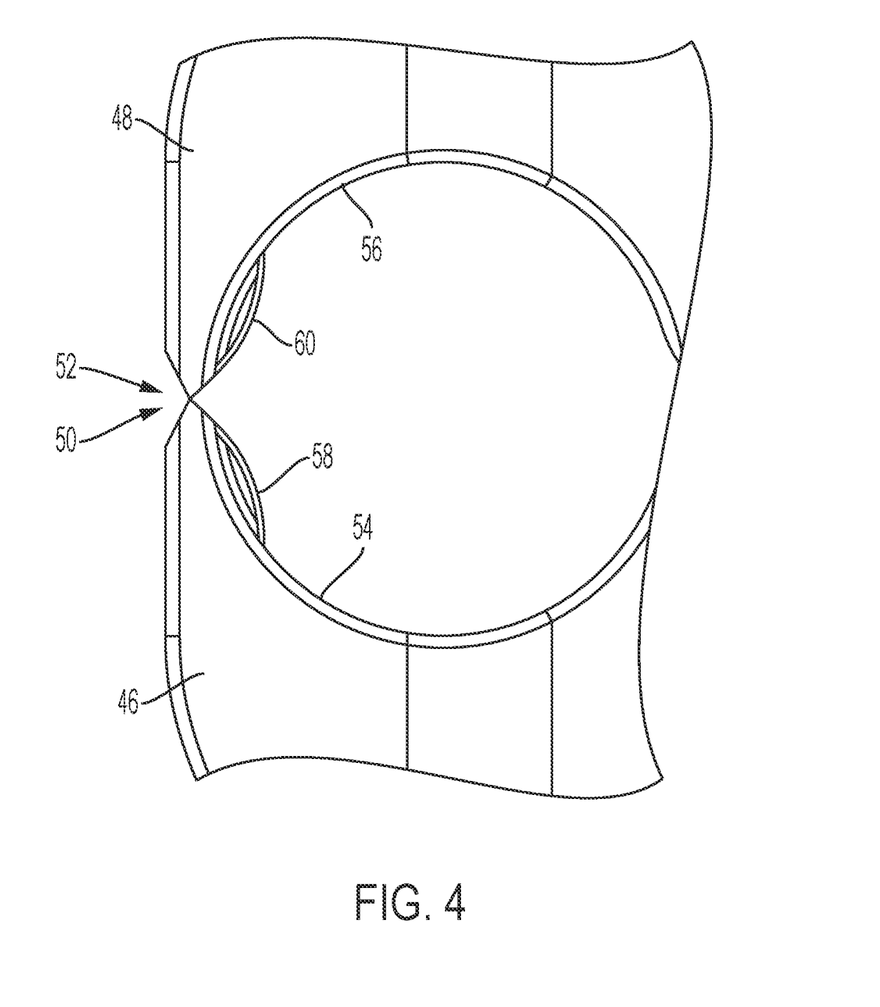
FIG. 4 is an enlarged side view of the cutting end of the cutting tool of FIG. 1.
Figure 5:
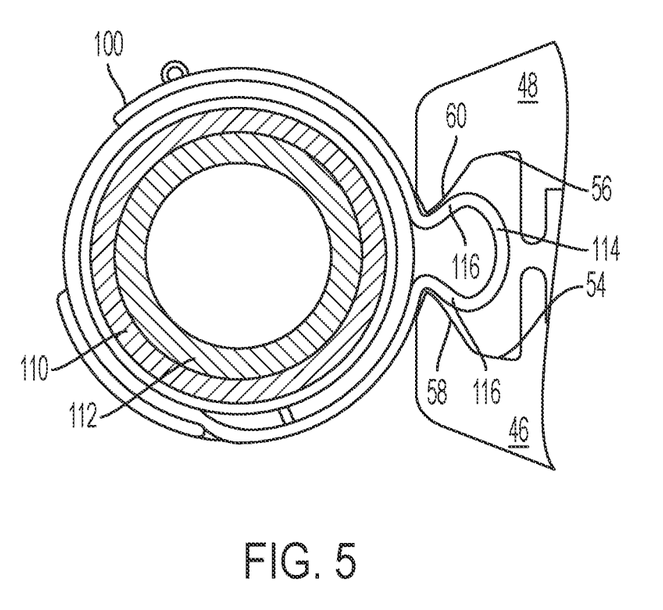
FIG. 5 is a side view of a cutting tool being used to crimp an ear clamp.

Referring to FIG. 5, an example is shown of the operation of the cutting tool 20 when attempting a crimping operation. The operator initially slides the band clamp 100 onto the tube 110 to be coupled and installs the end of the tube 110 over a fitting 112. The band clamp 100 has a u-shaped section, sometimes referred to as an "ear" 114 that is defined by a pair of opposing legs that are joined by an end section. When the tool 20 is used in an unintended manner, the ear 114 can be inserted between the edges 50, 52. As the operator squeezes the handles 22, 24, the ear 114 starts to crimp or deform such that the portion closest to the tube 110 deflects inward, and the outer portion of the ear 114 expands outward. As the crimping continues, the "legs" 116 of the ear 114 engage the projections 58, 60. This contact of the projections 58, 60 with the legs 116 prevents the clamp 100 from being fully closed when the tool 20 is moved to the fully closed position. In other words, the tool 20 will be unable to close completely. As the operator tries to close the tool, the hand force will increase dramatically, providing a tactile feedback to the operator that there is something wrong. Further, the clamp will remain in a visibly open position. As a result, the operator will immediately know that an improper crimp was performed and the risk of the clamp 100 loosening later is reduced.

Figure 6:
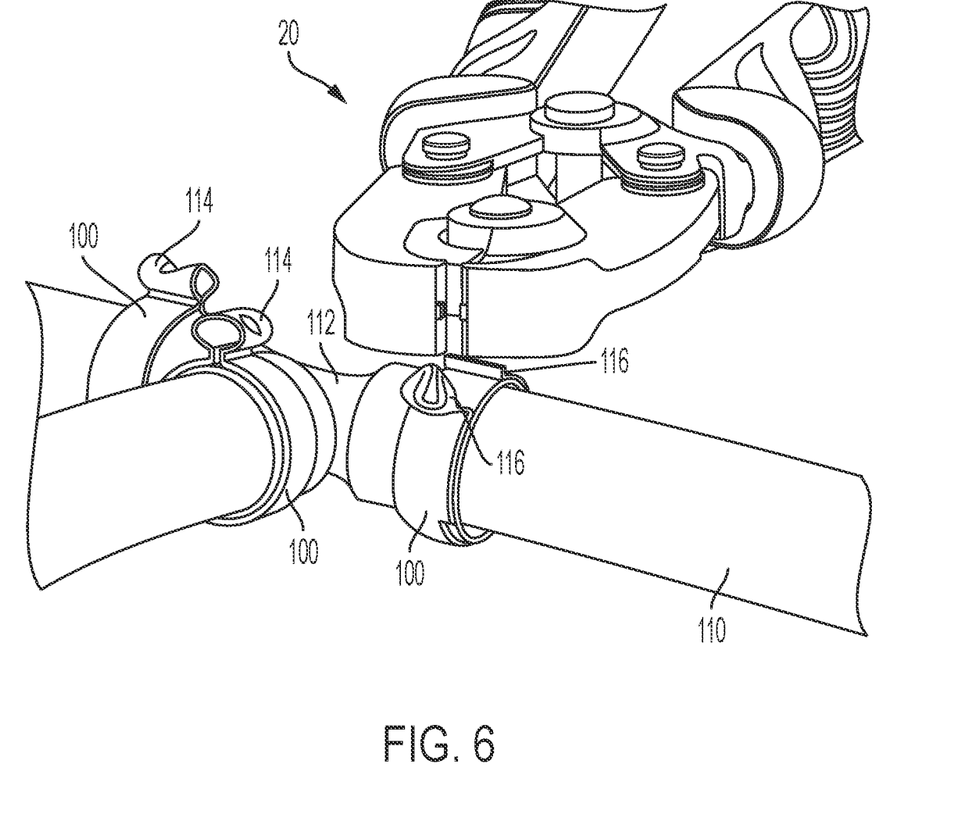
FIG. 6 is a perspective view of the cutting tool being used to remove a crimped ear clamp.

Referring to FIG. 6, an example is shown of an intended operation of the cutting tool 20. As illustrated, the tool 20 is oriented perpendicular to the hoses 110 and one of the legs 116 is placed between the edges 50, 52 such that the projections 58, 60 are offset from the top of the ear 114 or the sides of the legs 116. The operator squeezes the handles 22, 24 causing the edges 50, 52 to move toward each other and cut into the metal of the leg 116. The handles 22, 24 are squeezed until the edges 50, 52 cut through the leg 116. Since the projections 58, 60 are offset from the ear 114, the projections 58, 60 do not interfere with the cutting operation.

It should be appreciated that while embodiments herein refer to the use of a tool 20 with a particular type of clamp (e.g. an ear type band clamp), this is for exemplary purposes and the claims should not be so limited. In other embodiments, the tool 20 may be used with other types of clamps. In still other embodiments, the tool 20 may be adapted to cooperate with ring clamps.

Technical effects and benefits of some embodiments include providing a tool that allows the cutting of a clamp while preventing its use for crimping.

The term "about" is intended to include the degree of error associated with measurement of the particular quantity based upon the equipment available at the time of filing the application. The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A cutting tool comprising:
   a first jaw member having a first cutting edge and a first relief area adjacent the first cutting edge, the first jaw member further having a first projection extending from a beveled surface of the first cutting edge into the first relief area;
   a second jaw member having a second cutting edge and a second relief area adjacent the second cutting edge, the second jaw member further having a second projection extending from a beveled surface of the second cutting edge into the second relief area; and
   wherein the first projection and the second projection are sized to engage a leg of an ear clamp and prevent fully closing the ear clamp when the cutting tool is used in a crimping operation.

2. The cutting tool of claim 1, wherein the first projection and the second projection have a convex outer surface.

3. The cutting tool of claim 2, wherein the first projection and the second projection are centrally located along the first cutting edge and the second cutting edge.

4. The cutting tool of claim 2, wherein the first cutting edge and the second cutting edge are configured to cut the leg of the ear clamp when the cutting tool is used in a cutting operation.

5. The cutting tool of claim 4, wherein the first cutting edge is configured to cut the leg in a first area between the first projection and a first side of the first jaw member.

6. The cutting tool of claim 5, wherein the second cutting edge is configured to cut the leg in a second area between the second projection and a second side of the second jaw member.

7. The cutting tool of claim 6, wherein the first area is opposite the second area.

8. A cutting tool, comprising:
   a first handle;
   a second handle pivotally coupled to the first handle;
   a first jaw pivotally coupled to the first handle, the first jaw having a first pincher end, the first pincher end having a first relief area, a first cutting edge, and a first projection that extends from a beveled surface of the first cutting edge into the first relief area;
   a second jaw pivotally coupled to the second handle, the second jaw having a second pincher end, the second pincher end having a second relief area, a second cutting edge, and a second projection that extends from a beveled surface of the second cutting edge into the second relief area, the second jaw being pivotally coupled to the first jaw; and
   wherein the first projection and the second projection are sized to engage a leg of an ear clamp and prevent fully closing of the ear clamp when the cutting tool is used in a crimping operation.

9. The cutting tool of claim 8, wherein the first projection and the second projection have a convex outer surface.

10. The cutting tool of claim 9, wherein the first projection and the second projection are centrally located along the first cutting edge and the second cutting edge.

11. The cutting tool of claim 9, wherein the first cutting edge and the second cutting edge are configured to cut the leg of the ear clamp when the cutting tool is used in a cutting operation.

12. The cutting tool of claim 11, wherein the first cutting edge is configured to cut the leg in a first area between the first projection and a first side of the first jaw.

13. The cutting tool of claim 12, wherein the second cutting edge is configured to cut the leg in a second area between the second projection and a second side of the second jaw.

14. The cutting tool of claim 13, wherein the first area is opposite the second area.

15. A method of operating a cutting tool, the method comprising:
   placing an ear portion of an ear clamp between a first cutting edge and a second cutting edge of the cutting tool, the first cutting edge having a first projection extending from a beveled surface of the first cutting edge into a first relief area, the second cutting edge having a second projection extending from a beveled surface of the second cutting edge into a second relief area;

moving handles of the cutting tool from an open position towards a closed position; engaging the first projection and the second projection on a pair of opposing legs of the ear portion as the handles are moved from the open position towards the closed position; and preventing fully closing of the ear clamp based on the engaging of the first projection and the second projection on the pair of opposing legs of the ear portion.

16. The method of claim 15, further comprising:

placing one of the pair of opposing legs between the first cutting edge and the second cutting edge, wherein the first projection and the second projection are offset from the ear portion of the ear clamp;

moving the handles from the open position towards the closed position; and cutting through the one of the pair of opposing legs as the handles are moved to the closed position.

\* \* \* \* \*